United States Patent
Otsuki et al.

(10) Patent No.: US 6,823,234 B2
(45) Date of Patent: Nov. 23, 2004

(54) CURVE INTERPOLATION METHOD

(75) Inventors: Toshiaki Otsuki, Hino (JP); Hideo Ogino, Fujiyoshida (JP); Soichiro Ide, Fujiyoshida (JP); Takuji Chiba, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/624,600

(22) Filed: Jul. 23, 2003

(65) Prior Publication Data

US 2004/0122549 A1 Jun. 24, 2004

(30) Foreign Application Priority Data

Aug. 16, 2002 (JP) ........................................ 2002-237394

(51) Int. Cl.$^7$ ............................................... G06F 19/00
(52) U.S. Cl. ........................................ 700/189; 700/181
(58) Field of Search ................................ 700/189, 181, 700/159–195, 98, 118

(56) References Cited

U.S. PATENT DOCUMENTS

| | | | |
|---|---|---|---|
| 5,726,896 A | * | 3/1998 | Jia et al. ...................... 700/187 |
| 5,936,864 A | * | 8/1999 | Otsuki et al. ................ 700/188 |
| 6,587,747 B2 | * | 7/2003 | Hirai et al. .................. 700/189 |
| 6,609,045 B1 | * | 8/2003 | Fujino ......................... 700/189 |
| 2004/0024472 A1 | * | 2/2004 | Evans et al. .................... 700/2 |

FOREIGN PATENT DOCUMENTS

| | | |
|---|---|---|
| JP | 2-113305 | 4/1990 |
| JP | 10-240328 | 9/1998 |

* cited by examiner

Primary Examiner—Albert W. Paladini
Assistant Examiner—Chad Rapp
(74) Attorney, Agent, or Firm—Staas & Halsey LLP (57) ABSTRACT

A curve interpolation method capable of obtaining a curve approximating an original curve based on a sequence of command points within a tolerance set for the original curve, and performing interpolation on the obtained curve. Points $Q1, \ldots, Q2n$ are interpolated between respective two adjacent command points $(P0, P1), (P1, P2), \ldots, (Pn-1, Pn)$ as shape-defining points. The shape-defining points are positioned within a tolerance width $2w$ set to the original curve. One shape-defining point and shape-defining points surrounding the one shape-defining point are successively selected and an approximate curve for the selected shape-defining points is successively created. The one shape-defining point is moved towards the approximate curve to determine a modified shape-defining point for the one shape-defining point. A smooth curve passing a sequence of the modified shape-defining points is created and interpolation for machining is performed on the created curve. Since the shape-defining points are positioned closer to an original target curve within a tolerance width set to the original curve than the command points, the created smooth curve passing the sequence of modified shape-defining points is well approximating the original target curve within the tolerance width.

14 Claims, 9 Drawing Sheets

```
......
......
G06.3 X100.0 Y200.0 Z300.0 F10000;   (START INTERPOLATION BY CREATTING SMOOTH CURVE)
X101.023 Y202.512 Z311.345;           (SEQUENCE OF COMMAND POINTS)
X103.234 Y203.876 Z315.123 ;
......
......
G06.9;                                (STOP INTERPOLATION BY CREATING SMOOTH CURVE)
......
......
```

CURVE INTERPOLATION METHOD

BACKGROUND OF THE INVENTION

1. Field of the Invention

The present invention relates to a curve interpolation method for obtaining a smooth curve based on data of a sequence of command points and performing interpolation on the smooth curve in machining a workpiece along a curved surface using a numerical controller.

2. Description of Related Art

In machining a workpiece along a curved surface of an object such as a mold by a numerical controlled machine tool, etc. according to data of a sequence of command points which are created by a CAD/CAM device or a profiler device, a curve interpolation is performed based on the data of the sequence of command points. For example, there is disclosed a method of creating an approximate spline curve based on the data of the sequence of command points and performing the curve interpolation on the created approximate spline curve in JP 2-113305A.

In JP 10-240328A, there is described an interpolation method in which vectors of line segments between adjacent twos of command points are obtained and a modification amount for each command point is obtained such that the sum of squares of differential vectors between the obtained vectors of the line segments is the least so as to modify each command point. In this document, it is described to set an evaluation range in a sequence of the command points and create an approximate curve for successive points in the evaluation range, so that the command points are modified based on differences between the approximate curve and the respective command points in the evaluation range.

In the CAD/CAM device, a tolerance is set for a target curve created by the CAD device and a plurality of line segments are created by the CAM device within the tolerance to obtain data of end points of the respective line $$f(t)_x = A_x t^3 + B_x t^2 + C_x t + D_x$$

$$f(t)_y = A_y t^3 + B_y t^2 + C_y t + D_y$$

$$f(t)_z = A_z t^3 + B_z t^2 + C_z t + D_z$$

Figure 20:
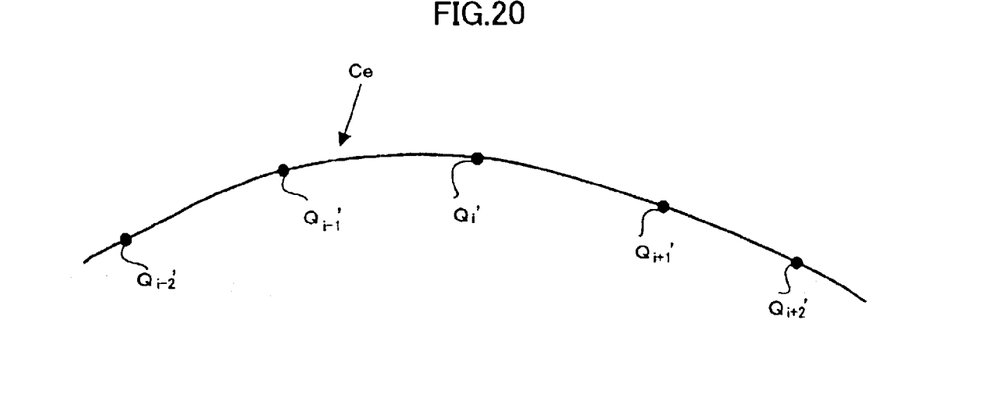
FIG. 20 is a schematic diagram showing an example of a smooth curve created according to the present invention.

Thus obtained curve Ce is shown in FIG. 20.

Then, interpolation is performed on the defined curve Ce with a unit not greater than a set unit in preparing the sequence of command points (Step S16).

In the foregoing embodiment, at the start of the procedure, all of the command points P0, P1, P2, . . . , Pn−1, Pn are read at Step S1. Alternatively, only the necessary command points may be read and the procedure may be carried out on the read points, so that the approximate curve is successively created while reading the data of the command points to expedite the procedure.

In obtaining interpolation points, i.e. shape-defining points, respective two points are interpolated between adjacent twos of the command points in the foregoing embodiment, respective points more than two may be interpolated between adjacent twos of the command points. Further, in creating the approximate curve Cm, the shape-defining points not greater than two are selected before and after the shape-defining point Qi. The shape-defining points greater than two may be selected. Furthermore, one or more of the command points P0, P1, P2, . . . , Pn−1, Pn may be used as the shape-defining points with the interpolation points Q1, Q2, . . . , Q2n.

If a line segment connecting adjacent two of the command points P0, P1, P2, . . . , Pn−1, Pn is shorter than a reference value, an interpolated point Pj', such as a middle point between such adjacent command points Pj, Pj+1 may be regarded as a substitute command point for the adjacent command points Pj, Pj+1 which are to be deleted. In this case, it is determined whether or not a distance between the adjacent command points Pi and Pi+1 is not greater than the predetermined at Step S2, and if the distance is not greater than the predetermined value, the above procedure is performed to define a substitute command point for obtaining the interpolation points. segments as a sequence of command points to be outputted to the numerical controller.

Figure 1:
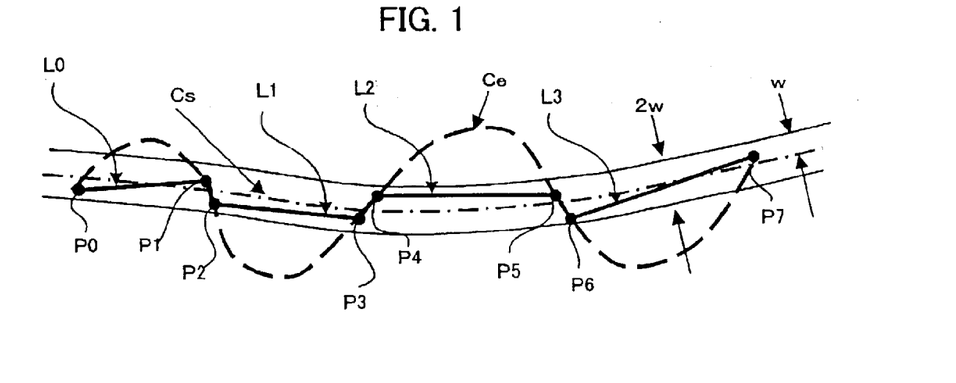
FIG. 1 is a schematic diagram showing a conventional interpolation method in which a curve is created based on a sequence of command points.

As shown in FIG. 1, line segments L0, L1, L2, . . . are created by the CAM device within a tolerance width "2w" set by a tolerance amount "w" on both sides of an original target curve Cs which are created by the CAD device, and data of points P0, P1, P2, . . . at both ends of respective line segment L0, L1, L2, . . . are outputted to a numerical controller as data of a sequence of command points. Since a curve Ce for the curve interpolation is defined based on the position data of the sequence of command points, the curve Ce may exceed the tolerance width 2w set to the original curve Cs.

According to the method disclosed in JP10-240328A, the positions of the command points are modified but there is a possibility of creating the curve Ce same as that in FIG. 1 based on the modified command points, and it is not assured that the curve Ce is created within the tolerance width 2w set for the original curve Cs.

Figure 2:
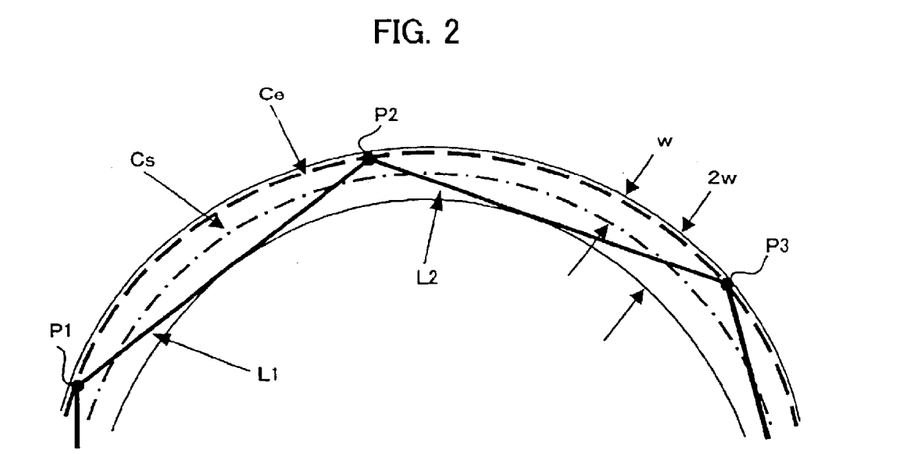
FIG. 2 is a schematic diagram showing an original target curve and a created curve in a case where the original target curve is a circular arc.
Figure 3:
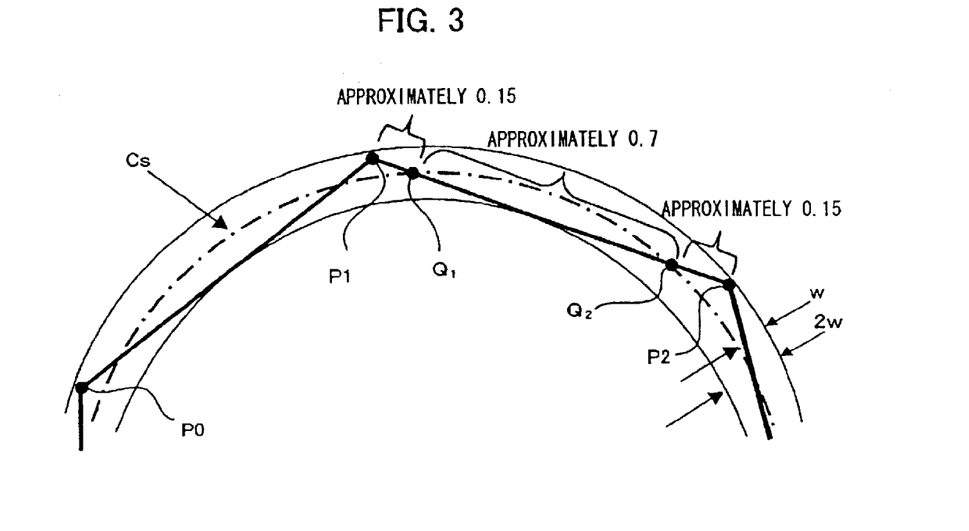
FIG. 3 is a schematic diagram showing intersection between the original target curve and line segments connecting adjacent twos of the command points in the conventional interpolation method.
Figure 4:
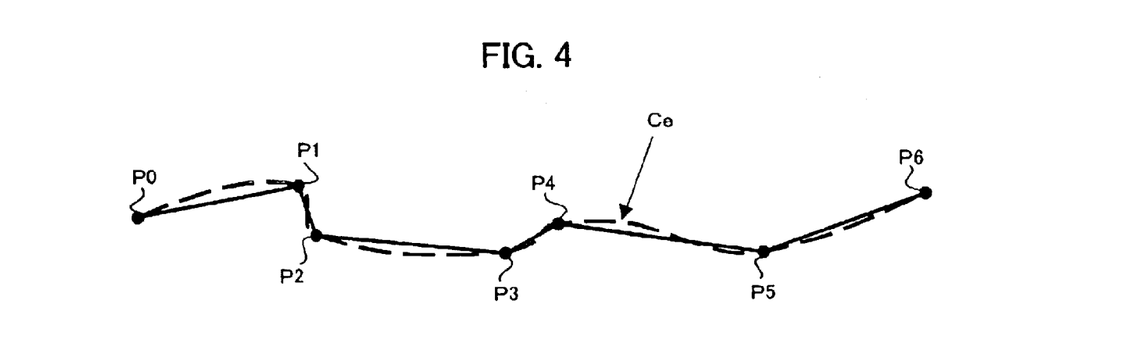
FIG. 4 is a schematic diagram showing an example of an inappropriate curve created from the command points according to the conventional method.

It is probable that the sequence of command points are positioned near ends of a band of the tolerance width 2w set to the original curve Cs. Therefore, if the curve Ce is defined based solely on the sequence of command points, the curve Ce may be positioned considerably remote from the original curve Cs. For instance, in the case where the original curve Cs is a circular arc, as shown in FIG. 2, the command points P0, P1, P2, . . . defined by the line segments L0, L1, L2, . . . within the tolerance width 2w are positioned remote from the original curve Cs by an mount approximately equal to the tolerance amount w. In this case, two points Q1 and Q2 interpolated on each of the line segments L0, L1, L2, . . . at a ratio of approximately 0.15:0.7:0.15 are positioned on the original curve Cs, as shown in FIG. 3.

The above circumstance is the same in the case where the positions of the command points are modified. For example, in the case where the original curve is a circular arc, since a sequence of command points are aligned along a circular arc, if a curve approximating the command points is created, the sequence of command points are not substantially modified. Thus, the modified sequence of command points are positioned remote form the original curve Cs by the tolerance amount w.

Since the curve Ce is defined to pass the sequence of command points P0, P1, P2, . . . , if there is an error in calculation for obtaining the sequence of command points P0, P1, P2, . . . or in approximation by a set unit in the CAD/CAM device, the error influences the definition of the curve Ce to lower machining precision and cause a vibration of the machine. Thus, the definition of the curve Ce to pass the sequence of command points may cause deterioration of the precision of the machined surface.

SUMMARY OF THE INVENTION

An object of the present invention is to provide a curve interpolation method capable of obtaining a curve approximating an original target curve within a tolerance set for the original target curve based on a sequence of command points, and performing interpolation on the obtained curve.

Figure 5:
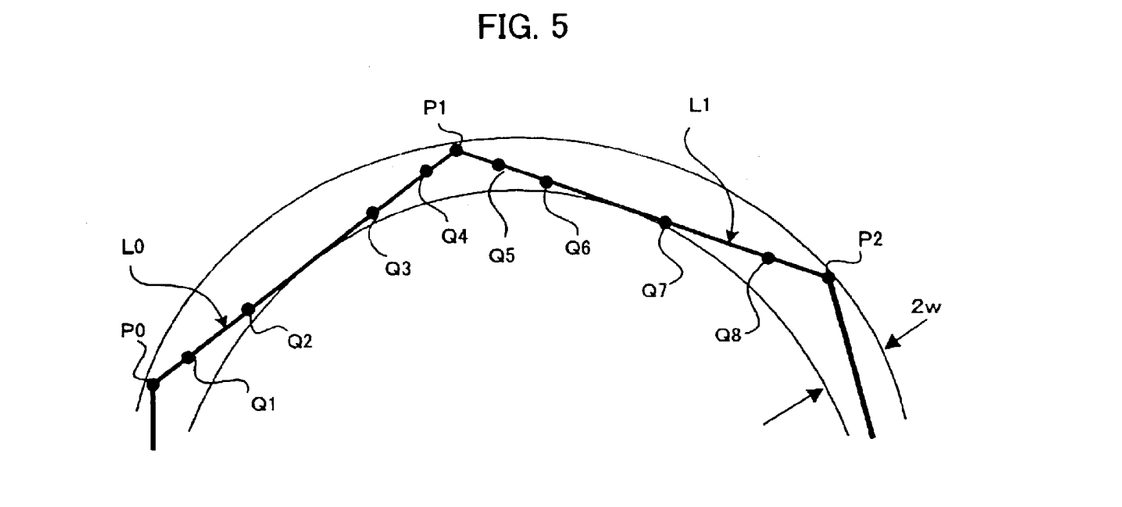
FIG. 5 is a schematic diagram showing interpolation points used as shape-defining points according to the present invention.

As describe, the command points P0, P1, P2, . . . are positioned within the tolerance width 2w and the line segments L0, L1, L2, . . . connecting the adjacent twos of the command points (P0, P1), (P1, P2), . . . are positioned within the tolerance width 2w, as shown in FIG. 5. Therefore, points Q1, Q2, Q3, . . . interpolated on the respective line segments L0, L1, L2, . . . are positioned within the tolerance width 2w. According to the present invention, a smooth curve Ce approximating an original curve Cs is defined using the interpolated points Q1, Q2, Q3, . . . , and a curve interpolation for machining a workpiece is performed on the smooth curve Ce by a procedure comprising the following steps (1)–(7).

(1) Interpolation points Q1, Q2, Q3, . . . are defined between adjacent twos of the command points (P0, P1), (P1, P2), . . . , as shape-defining points. The shape-defining points Q1, Q2, Q3, . . . are positioned inner the band of the tolerance width 2w, i.e. closer to the original curve Cs than the command points P0, P1, P2, . . . .

(2) One shape-defining point Qi and adjacent shape-defining points in front of and in the rear of the one shape-defining point Qi to be surrounded by these adjacent points are selected.

Figure 6:
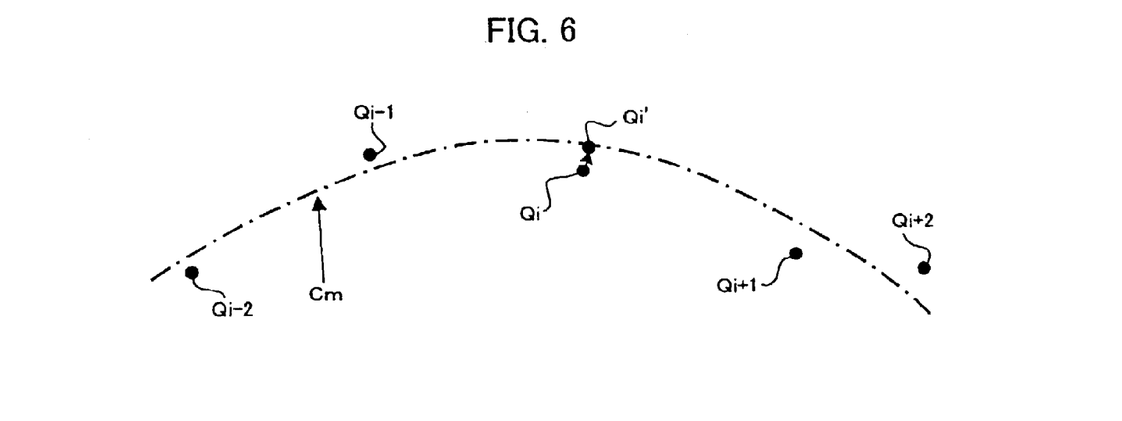
FIG. 6 is a schematic diagram showing movement of the shape-defining point toward the approximate curve to obtain a modified shape-defining point.

(3) A curve Cm approximating the selected shape-defining points is created, as shown in FIG. 6.

(4) The one shape-defining point Qi is moved towards the approximate curve Cm to define the modified command point Qi'.

(5) Repeatedly executing the above steps (2)–(4) successively on the other shape-defining points to obtain the modified shape-defining points Q1', Q2', Q3', . . . .

(6) A curve Ce passing the modified command points Q0', Q1', Q2', . . . is defined.

(7) The interpolation is performed on the obtained curve Ce.

In the step (1), one or more of the command points P0, P1, P2, . . . may be used as the shape-defining points in addition to the interpolated points Q1, Q2, Q3, . . . . In this step (1), the interpolation points Q1, Q2, Q3, . . . are created with a unit not greater than a set unit in preparing the sequence of command points P0, P1, P2, . . .

Figure 7:
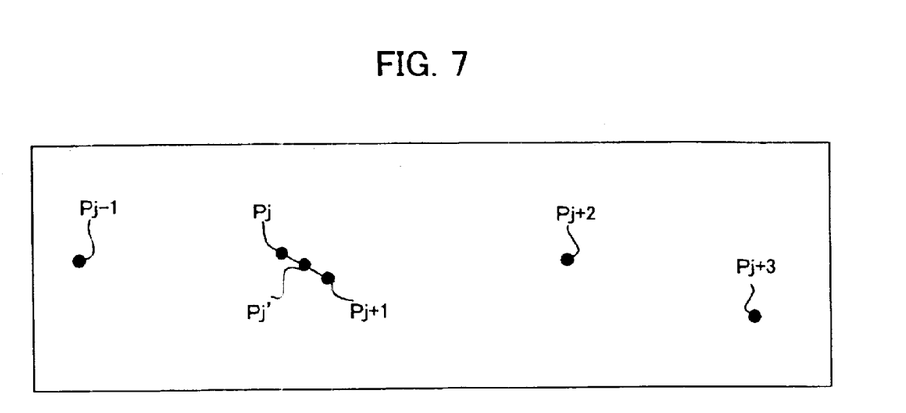
FIG. 7 is a schematic diagram showing substitution of command points.

In the step (1), if a distance between adjacent two of the command points Pj, Pj+1 is shorter than a first reference value, an interpolation point Pj' between the adjacent two command points Pj, Pj+1 is used as a substitute therefor, as shown in FIG. 7. The interpolated point may be a middle point of the adjacent two command points Pj, Pj+1.

In the step (3), the approximate curve Cm may be created to have the least sum of squares of distances from the selected shape-defining points.

In the step (4), an amount of moving the one shape-defining point Qi for modification may be restricted to a set value.

Figure 8:
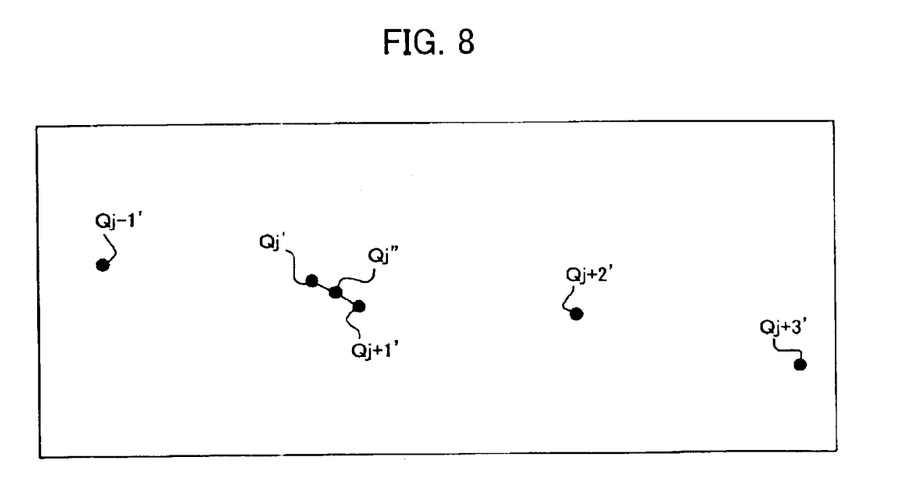
FIG. 8 is a schematic diagram showing substitution of modified shape-defining points.

In the step (4), if a distance between adjacent two of the modified shape-defining points Qj', Qj+1' is shorter than a second reference value, an interpolation point Qj" between the adjacent two modified shape-defining points Qj', Qj+1' is used as a substitute for the two modified shape-defining points, as shown in FIG. 8. The interpolated point Qj" may be a middle point of the adjacent two modified shape-defining points Qj', Qj+1'.

In the step (4), the one shape defining point Qi may be moved gradually with a unit not greater than a set unit in preparing the sequence of command points P0, P1, P2, . . . .

Figure 9:
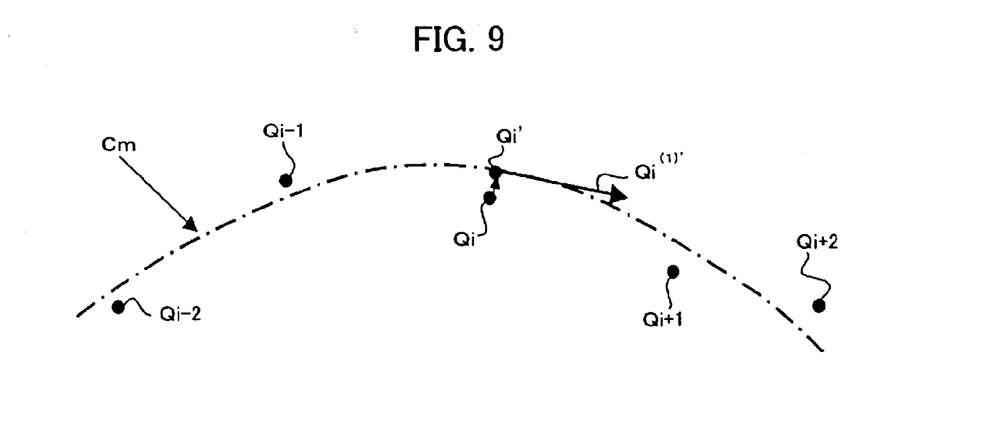
FIG. 9 is a schematic diagram showing a first-order differentiated value for a modified shape-defining point.

In the step (6), first-order differentiate values $Q0^{(1)\prime}$, $Q1^{(1)\prime}$, $Q2^{(1)\prime}$, . . . of the approximate curve Cm at points corresponding to the modified shape-defining points Q0', Q1', Q2', . . . are used in creating the curve Ce passing a sequence of modified shape-defining points Q0', Q1'; Q2', . . . , as shown in FIG. 9.

In the step (6), the curve Ce passing the modified command points Q0', Q1', Q2', . . . may be a NURBS curve or a spline curve.

In the step (7), the interpolation on the obtained curve Ce is performed with a unit not greater than a set unit in preparing the sequence of command points P0, P1, P2, . . . .

DETAILED DESCRIPTION OF THE PREFERRED EMBODIMENTS

Figure 10:
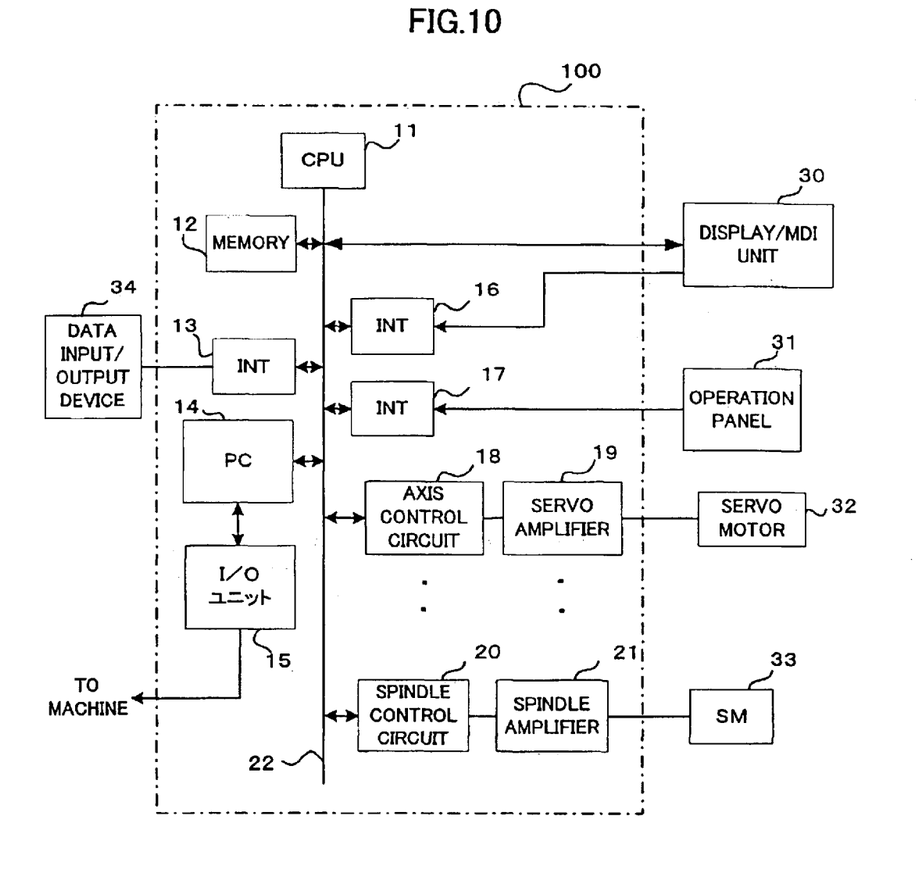
FIG. 10 is a block diagram of a numerical controller for carrying out the method of the present invention.

FIG. 10 shows a numerical controller 100 for carrying out the curve interpolating method of the present invention.

A processor (CPU) 11 for generally controlling the numerical controller 100 is connected with a memory 12 including a ROM, a RAM and a CMOS memory backed up by a battery; an interface 13 to which a data input/output device 34 is connected; an interface 16 to which a display/MDI unit 30 is connected; an interface 17 to which an operation panel 31 is connected; a PC (programmable controller) 14; a display/MDI unit 30; axis control circuits 18; and a spindle control circuit 20, through a bus 22.

The axis control circuits 18 output commands to the servo amplifiers 19 for respective axes in accordance with motion commands from the processor 11. The servo amplifiers 19 drive servomotor 32 for the respective axes in accordance with the commands from the axis control circuits 18. Each of the servomotors 32 has a position/velocity detector (not shown) for feeding back position/velocity feedback signals to the associated axis controller 18 for feedback control of the position/velocity of the axis.

The spindle control circuit 20 outputs a spindle speed signal to the spindle amplifier 21 based on a spindle speed command from the processor 11 and a speed feedback signal from a position coder provided at the spindle motor 33. The spindle amplifier 21 drives the spindle at the commanded speed in accordance with the spindle speed command.

A machining program including data of the command points created by the CAD/CAM device or a profile device is inputted into the numerical controller 100 from the data input/output device 34 through the interface 13 and stored in the nonvolatile section of the memory 12.

Figure 11:
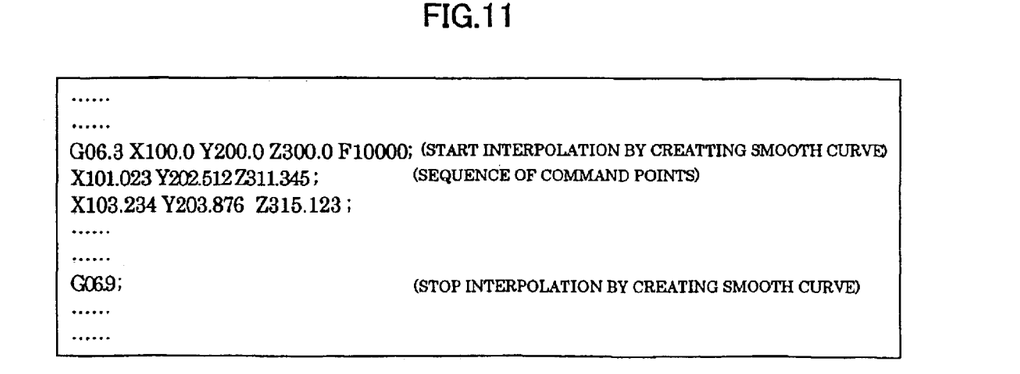
FIG. 11 is a schematic diagram showing a part of a machining program for executing the curve interpolation according to the present invention.

G-codes commanding a start of defining a smooth curve and interpolation thereon, and commanding discontinuation of the command are prepared. A G-code "G06.3" for commanding a start of defining a smooth curve and interpolation thereon is programmed at the beginning of data of a sequence of command points, and a G-code "G06.9" is programmed at a position where this command is to be discontinued in the machining program. The procedure of defining a smooth curve and interpolation thereon is carried out in a section between the codes "G06.3" and "G06.9".

Figure 12:
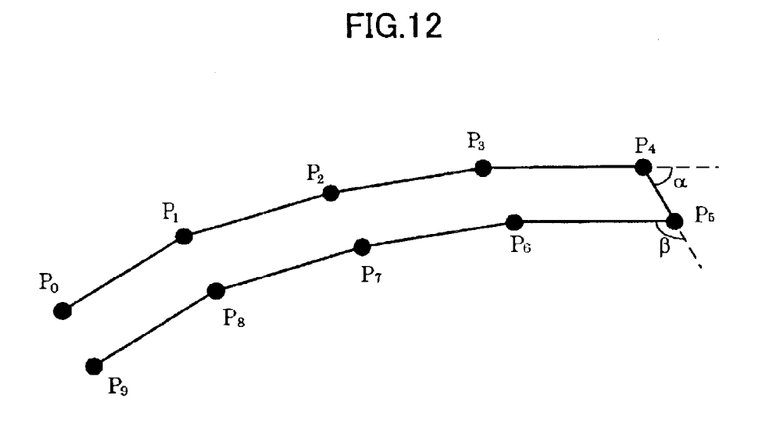
FIG. 12 is a schematic diagram of a sequence of command points for which automatic determination of carrying out the curve interpolation of the present invention is performed.

The section in which definition of a smooth curve and interpolation thereon are performed may be automatically determined. In this case, the processor 11 reads the sequence of command points from the machining program and determines whether or not the creation and interpolation of the smooth curve is to be performed based on angles between adjacent ones of the line segments or lengths of the line segments interconnecting the adjacent ones of the command points. As shown in FIG. 12, angles between adjacent line segments interconnecting adjacent ones of command points P1, P2, P3 and command points P6, P7, P8 are smaller than a reference value. Thus, it is determined that a smooth curve is to be created and interpolated in these sections. Contrary, an angle a between a line segment interconnecting command points P3 and P4 and a line segment interconnecting command points P4 and P5 are relatively large. Similarly, an angle β between the line segment interconnecting command points P4 and P5 and a line segment interconnecting command points P5 and P6 is larger than the reference value. Thus, it is determined that a smooth curve is not to be created and interpolated in the section between the command points P4 and P5. Namely, if an angle between the line segments interconnecting the adjacent command points is not greater than the reference value, it is automatically determined that a smooth curve is to created and interpolated in the section of the line segment, and if the angle between the line segments interconnecting the adjacent command points is less than the reference value, it is automatically determined that a smooth curve is not to be created and interpolated.

Figure 13:
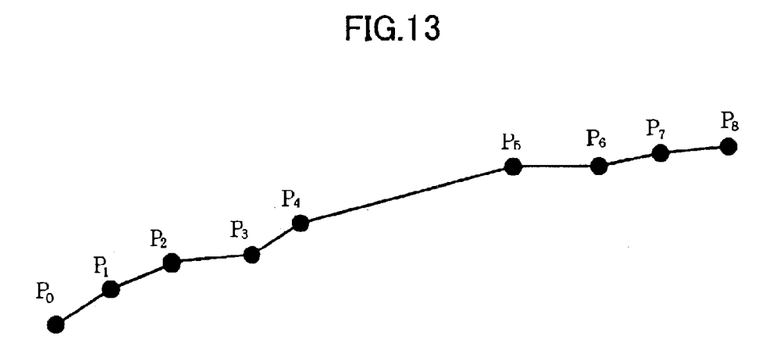
FIG. 13 is a schematic diagram of a sequence of command points for which another automatic determination of carrying out the curve interpolation of the present invention is performed.

Further, as shown in FIG. 13, distances between the adjacent command points from the command point P1 to the command point P4, and from the command point P5 to the command point P8 are relatively short, and a distance between the command point P4 and the command point P5 is relatively long. Thus, if the distance between the adjacent command points is not greater than a reference value, it is determined that a smooth curve is to be created and interpolated in the section defined by such command points, and if the distance between the adjacent command points is greater than a reference value, it is determined that a smooth curve is not to be created and interpolated in the sections between such command points.

Figure 14:
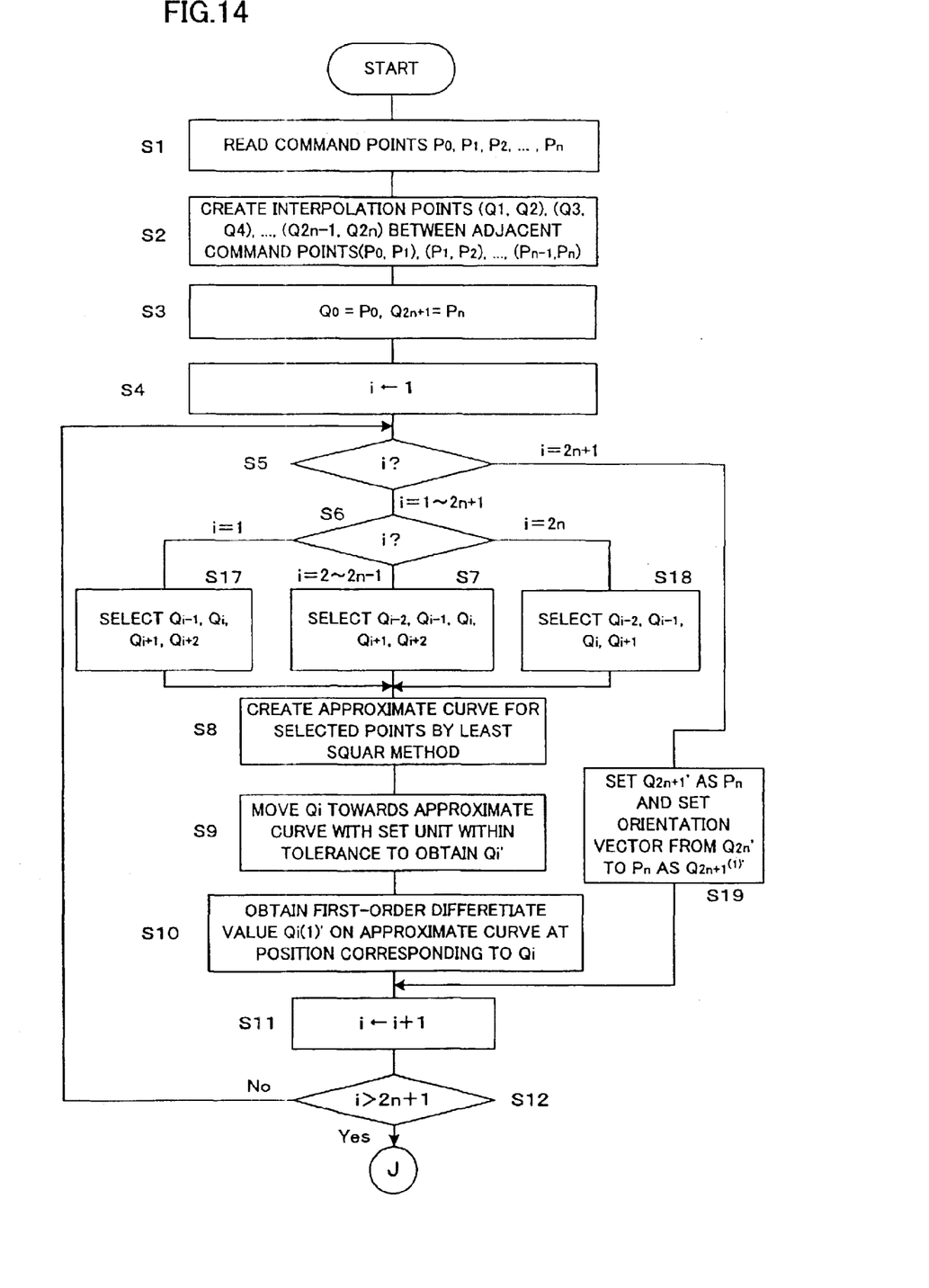
FIG. 14 is a part of flowchart of processing for the curve interpolation according to the present invention.
Figure 15:
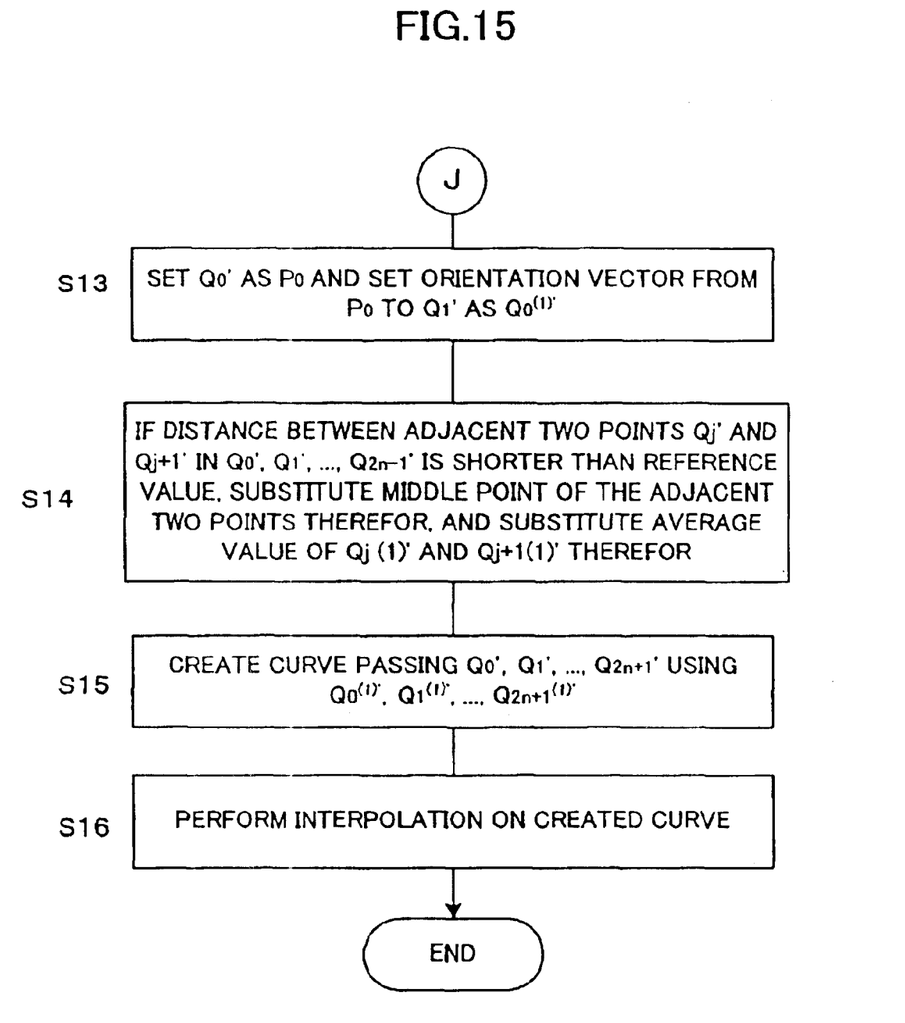
FIG. 15 is a continuation of the flowchart of FIG. 14.

The processing for defining a smooth curve and interpolation thereon will be described referring to flowcharts of FIGS. 14 and 15.

Figure 16:
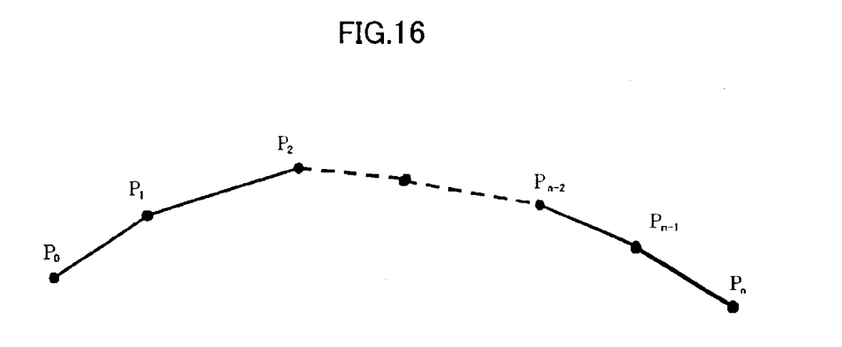
FIG. 16 is a schematic diagram of a sequence of command points.

The processor 11 reads a sequence of command points P0, P1, . . . , Pn−1, Pn from a machining program (Step S1). An example of the read command points P0, P1, . . . , Pn−1, Pn are shown in FIG. 16.

Figure 17:
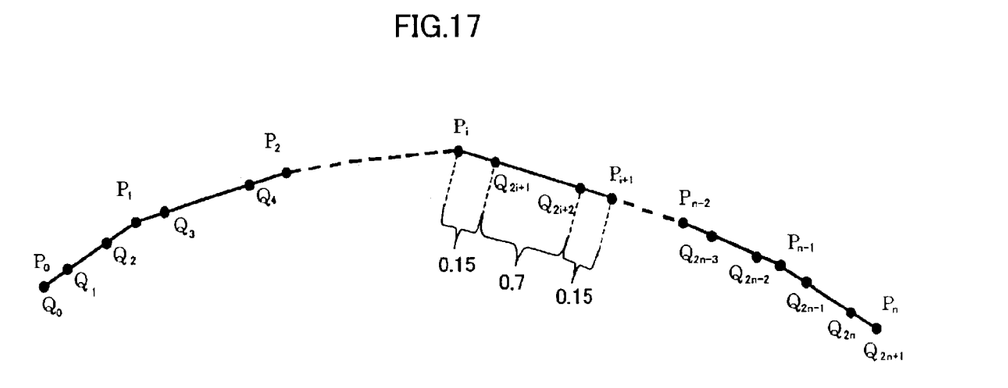
FIG. 17 is a schematic diagram showing interpolation points between adjacent twos of the command points for obtaining shape-defining points.

Respective two interpolation points (Q1, Q2), (Q3, Q4), . . . , (Q2n−1, Q2n) are defined between the adjacent two command points (P0, P1), (P1, P2), . . . , (Pn−1, Pn) (Step S2). In this example, an interpolation ratio is set to 1:0.7:0.15, as shown in FIG. 17. In particular, the interpolation ratio of interpolation points (Q2i+1, Q2i+2) on a line segment (Pi, Pi+1) is set such that a length of a line segment (Pi, Pi+1): a length of a line segment (Q2$i$+1, Q2i+2): a length of a line segment (P1, Q2i+1)=1:0.7:0.15.

A first shape-defining point Q0 is set to P0 and a last shape-defining point Q2n+1 is set to Pn (Step S3). Thus, a sequence of shape-defining points comprising a sequence of interpolation points Q0, Q1, Q2, . . . , Q2n, Q2n+1 are created.

Then, the index i is initially set to "1" in Step S4. A value of the index i is determined in Steps S5 and S6, and if it is determined that the index i is "1", the shape-defining points Qi−1, Qi, Qi+1, Qi+2 (=Q0, Q1, Q2, Q3) are selected (Step S17), if it is determined that the index i is "2, 3, . . . , or 2n−1", the shape-defining points Qi−2, Qi−1, Qi, Qi+1, Qi+2 are selected (Step S7), and if the index i is determined as "2n", the shape-defining points Qi−2, Qi−1, Qi, Qi+1 (=Q2n−2, Q2n−1, Q2n, Q2n+1) are selected (Step S18). If the index i is determined as "2n+1", the procedure as described later is performed.

Figure 18:
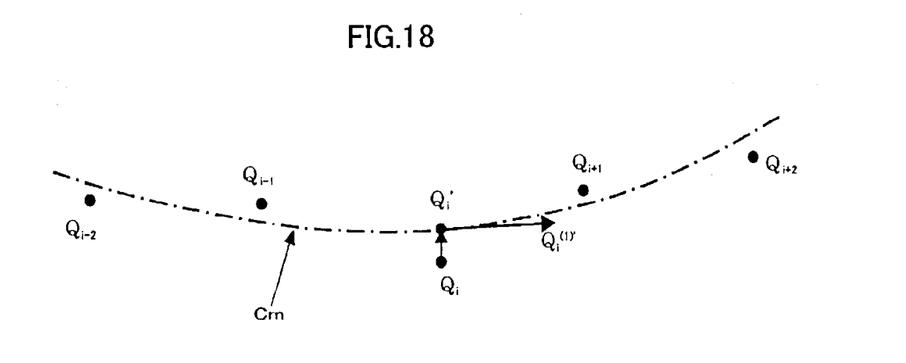
FIG. 18 is a schematic diagram showing an approximate curve for the shape-defining points for obtaining a modified shape-defining point and a first-order differentiated value therefor.

An approximate curve Cm is created based on thus selected shape-defining points by the least-squares method. Namely, the curve Cm having the least sum of squares of distances from the selected shape-defining points is defined (Step S8). An example of the approximate curve Cm is shown as the one-dotted chain line in FIG. 18. The shape-defining point Qi designated by the present value of the index i is moved towards the approximate curve Cm gradually with a unit not greater than a set unit in preparing the sequence of command points and within the tolerance width 2w to define a modified shape-defining point Qi' with respect to the shape-defining point Qi (Step S9). A first-order differentiated value $Qi^{(1)'}$ of the modified shape-defining point Qi' on the approximate curve Cm is obtained and stored (Step S10).

The index i is incrementally increased by "1" (Step S11), and it is determined whether or not the value of the index i exceeds "2n+1" which is the index of the last shape-defining point Q2n+1 (Step S12). If it is determined that the index i does not exceeds "2n+1", the procedure returns to Step S5 to repeat the processing of Step S5 and subsequent Steps.

When it is determined that the index i reaches "2n+1" in Step S5, a modified shape-defining point Q2n+1' is set as the command point Pn, and an orientation vector from the modified shape-defining point Q2n' to the command point Pn is stored as a first-order differentiated value $Q2n+1^{(1)'}$ with respect to the modified shape-defining point Q2n+1' (Step S19). Then, the index i is incrementally increased by "1" (Step S1). As a result, it is determined that the index i exceeds "2n+1" which is the index of the last shape-defining points Q2n+1 (Step S12), and the procedure proceeds to Step S13 where the modified shape-defining point Q0' is set as the command point P0, and an orientation vector from the command point P0 to the modified shape-defining point Q1' is set to a first-order differentiated value $Q0^{(1)'}$ with respect to the modified shape-defining point Q0' (=P0). With the above processing, the modified shape-defining points Q0', Q1', Q2', ..., Q2n¹, Q2n+1' and the first-order differentiated values $Q0^{(1)'}$, $Q1^{(1)'}$, $Q2^{(1)}$, ..., $Q2n^{(1)'}$, $Q2n+1^{(1)'}$ with respect to the shape-defining points Q0, Q1, Q2, ..., Q2n, Q2n+1 are calculated.

Figure 19:
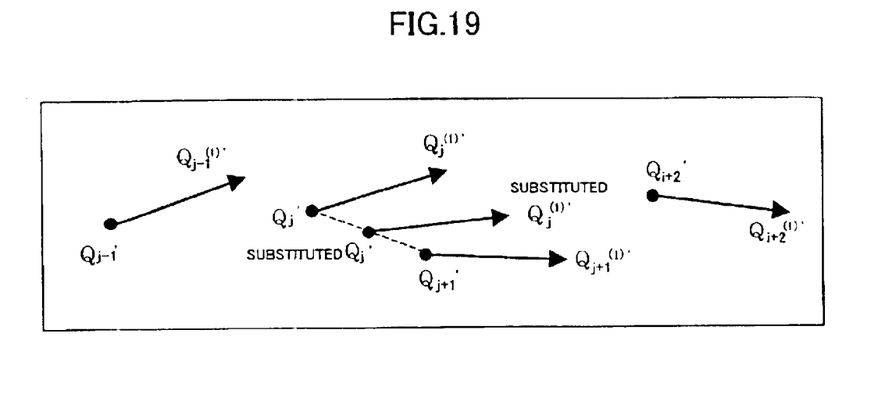
FIG. 19 is a schematic diagram showing a substitute point to be substituted for adjacent two modified shape-defining points and a substitute first-order differentiated value therefor.

Further, in this embodiment, as shown in FIG. 19, if there are two adjacent modified shape-defining points Qj' and Qj+1' having a distance therebetween shorter than a reference value in the modified shape-defining points Q0', Q1', ..., Q2n+1', an interpolation point is created between the two points Qj' and Qj+1'. In this embodiment, a middle point of the two points Qj' and Qj+1' is used as a substitute for the modified shape-defining points Qj' and Qj+1' which are to be deleted. Also, an average value of the first-order differentiated values $Qj^{(1)'}$ and $Qj+1^{(1)'}$ for the modified shape-defining points Qj' and Qj+1' is set as a substituted first-order differentiated value $Qj^{(1)'}$ for the substituted modified shape-defining point Qj', and the original first-order differentiated values $Qj^{(1)'}$ and $Qj+1^{(1)'}$ are deleted. The first modified shape-defining point Q0' and the last modified shape-defining point Q2n+1' of the sequence of modified shape-defining points and the first-order differentiated values $Q0^{(1)'}$ and $Q2n+1^{(1)'}$ for the first and last modified shape-defining points Q0' and Q2n+1' are not deleted.

With the above procedure, the modified shape-defining points Q0', Q1', ..., Q2n+1' and the first-order differentiated values $Q0^{(1)'}$, $Q1^{(1)'}$, ..., $Q2n+1^{(1)'}$ for the modified shape-defining points Q0', Q1', ..., Q2n+1' are obtained (Step S14).

Then, a curve Ce passing the modified shape-defining points Q0', Q1', ..., Q2n+1' is obtained based on the position data of the modified shape-defining points Q0', Q1', ..., Q2n+1' and the first-order differentiated values $Q0^{(1)'}$, Q1', ..., $Q2n+1^{(1)'}$ (Step S15).

For instance, since position data of the two shape-defining points Qj', Qj+1' and the first-order differentiated values $Qj^{(1)'}$, $Qj+1^{(1)'}$ at the respective shape-defining points Qj', Qj+1' are given, a third-order curve such as a spline curve or a NURBS curve passing these points can be defined. More specifically, in the case of defining a third-order curve by a spline curve connecting the two points Qj' and Qj+1, coefficients A, B, C and D in the following equation representing the spline curve are determined based on the position data of the two points Qj' and Qj+1' and the first-order differentiated values $Qj^{(1)'}$ and $Qj+1^{(1)'}$, and thus the three-order curve Ce is created to connect the two points Qj' and Qj+1' (Step S15).

$$f(t)=At^3+Bt^2+Ct+D$$

where A, B, C and D are coefficients and "t" is a curve parameter ranging from 0 to 1.0 f(t), A, B, C and D are vectors having values with respect to each axis of x, y and z.

In the foregoing embodiment, an interpolation ratio, i.e. the interpolation ratio of the interpolation points (Q2i+1, Q2i+2) between the line segment (Pi, Pi+1) is the distance between the line segment (Pi, Pi+1): the line segment (Q2i+1, Q2i+2): the line segment ((Pi, P2i+1)=1:0.7:0.15. The interpolation ratio may be other value.

According to the present invention, a smooth curve approximating an original target curve within a tolerance set to the original target curve is obtained based on a sequence of command points and interpolation for machining is performed on the obtained curve.

What is claimed is:

1. An interpolation method of creating a smooth curve based on a sequence of command points and performing interpolation on the smooth curve using a numerical controller, comprising the steps of:

(a) creating interpolation points between adjacent twos of the sequence of command points as shape-defining points;

(b) selecting one shape-defining point and shape-defining points in front and in the rear of the one shape-defining point from the shape-defining points created in said step (a);

(c) creating an approximate curve for the shape-defining points selected in said step (b);

(d) moving the one shape defining point towards the approximate curve created in said step (c) to determine a modified shape-defining point for the one shape-defining point;

(e) repeatedly executing said steps (b) to (d) for the other shape-defining points to obtain a sequence of modified shape-defining points;

(f) defining a curve passing the sequence of modified shape-defining points; and (g) perform interpolation on the curve defined in said step (f).

2. An interpolation method according to claim 1, wherein one or more of the command points are used as the shape-defining points in said step (a).

3. An interpolation method according to claim 1, wherein the interpolation points are created with a unit not greater than a set unit in preparing the sequence of command points in said step (a).

4. An interpolation method according to claim 1, wherein if a distance between adjacent two of the command points is shorter than a first reference value, an interpolation point between the adjacent two command points is used as a substitute therefor in said step (a).

5. An interpolation method according to claim 4, wherein the interpolated point is a middle point of the adjacent two command points.

6. An interpolation method according to claim 1, wherein the approximate curve is created to have the least sum of squares of distances from the selected shape-defining points in said step (c).

7. An interpolation method according to claim 1, wherein an amount of moving the one shape-defining point for modification is restricted to a set value in said step (d).

8. An interpolation method according to claim 1, wherein if a distance between adjacent two of the modified shape-defining points is shorter than a second reference value, a point interpolated between the adjacent two modified shape-defining points is used as a substitute therefor in said step (d).

9. An interpolation method according to claim 8, wherein the interpolated point is a middle point of the adjacent two modified shape-defining points.

10. An interpolation method according to claim 1, wherein the one shape-defining point is moved gradually with a unit not greater than a set unit in preparing the sequence of command points in said step (d).

11. An interpolation method according to claim 1, wherein first-order differentiate values of the approximate curve at points corresponding to the modified shape-defining points are used in creating the curve passing the sequence of modified shape-defining points in said step (f).

12. An interpolation method according to claim 1, wherein the curve defined in said step (f) is a NURBS curve.

13. An interpolation method according to claim 1, wherein the curve defined in said step (f) is a spline curve.

14. An interpolation method according to claim 1, wherein the interpolation is performed with a unit not greater than a set unit in preparing the sequence of command points in said step (g).

* * * * *

UNITED STATES PATENT AND TRADEMARK OFFICE
CERTIFICATE OF CORRECTION

PATENT NO. : 6,823,234 B2
DATED : November 23, 2004
INVENTOR(S) : Toshiaki Otsuki et al.

It is certified that error appears in the above-identified patent and that said Letters Patent is hereby corrected as shown below:

Column 1,
Line 40, transfer the portion that follows to Column 2, line 12, after "the interpolation points.", and insert the same in column 8, between lines 15 and 16:

-- $f(t)_x = A_x t^3 + B_x t^2 + C_x t + D_x$
$f(t)_y = A_y t^3 + B_y t^2 + C_y t + D_y$
$f(t)_z = A_z t^3 + B_z t^2 + C_z t + D_z$
Thus obtained curve Ce is shown in FIG. 20.

Then, interpolation is performed on the defined curve Ce with a unit not greater than a set unit in preparing the sequence of command points (Step S16).

In the foregoing embodiment, at the start of the procedure, all of the command points P0, P1, P2, ... , Pn-1, Pn are read at Step S1. Alternatively, only the necessary command points may be read and the procedure may be carried out on the read points, so that the approximate curve is successively created while reading the data of the command points to expedite the procedure.

In obtaining interpolation points, i.e. shape-defining points, respective two points are interpolated between adjacent twos of the command points in the foregoing embodiment, respective points more than two may be interpolated between adjacent twos of the command points. Further, in creating the approximate curve Cm, the shape-defining points not greater than two are selected before and after the shape-defining point Qi. The shape-defining points greater than two may be selected. Furthermore, one or more of the command points P0, P1, P2, ... , Pn-1, Pn may be used as the shape-defining points with the interpolation points Q1, Q2, ... , Q2n.

If a line segment connecting adjacent two of the command points P0, P1, P2, ... , Pn-1, Pn is shorter than a reference value, an interpolated point Pj' such as a middle point between such adjacent command points Pj, Pj+1 may be regarded as a substitute command point for the adjacent command points Pj, Pj+1 which are to be deleted. In this case, it is determined whether or not a distance between the adjacent command points Pi and Pi+1 is not greater than the predetermined at Step S2, and if the distance is not greater than the predetermined value, the above procedure is performed to define a substitute command point for obtaining the interpolation points.--

Column 3,
Line 3, change "describe" to -- described --

Column 5,
Line 65, change "a" (first occurence) to -- $\alpha$ --

Signed and Sealed this

Twenty-sixth Day of April, 2005

JON W. DUDAS
*Director of the United States Patent and Trademark Office*